March 31, 1931.　　　J. H. HOERN　　　1,798,738
BALL AND SOCKET JOINT AND METHOD OF MAKING SAME
Filed Jan. 13, 1930
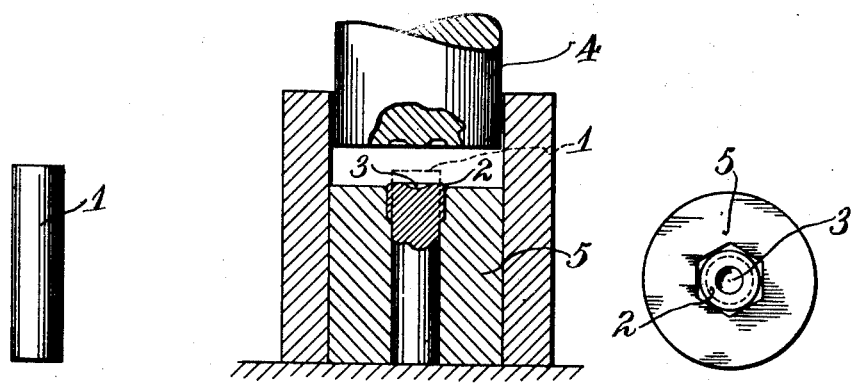
Fig.1.　　Fig.2.　　Fig.3.
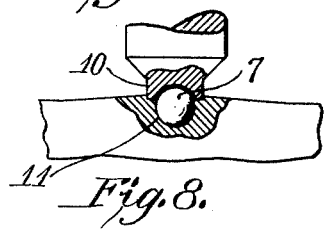
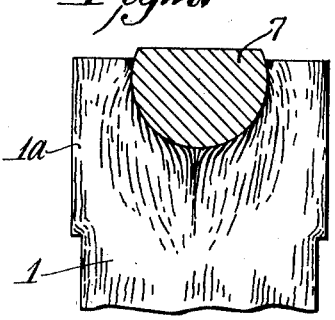
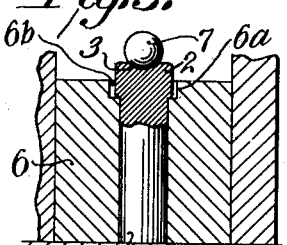
Fig.8.　　Fig.9.　　Fig.4a.
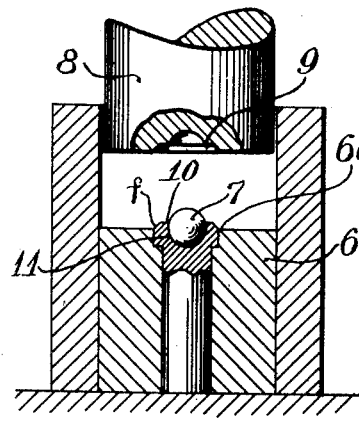
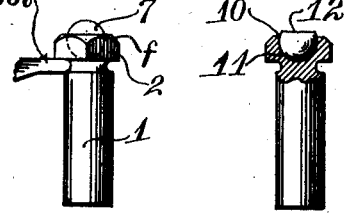
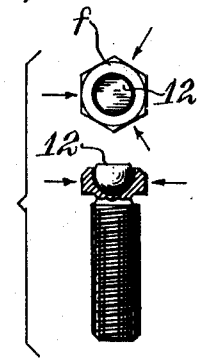
Fig.4.　　Fig.5.　　Fig.6.　　Fig.7.
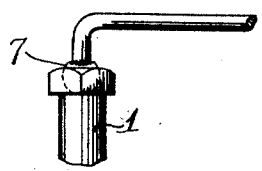
Fig.10.
INVENTOR
JOSEPH H. HOERN
BY George B. Willcox
ATTORNEY Patented Mar. 31, 1931

1,798,738

UNITED STATES PATENT OFFICE

JOSEPH H. HOERN, OF SAGINAW, MICHIGAN, ASSIGNOR TO WILCOX-RICH CORPORATION, OF DETROIT, MICHIGAN, A CORPORATION OF MICHIGAN

BALL AND SOCKET JOINT AND METHOD OF MAKING SAME

Application filed January 13, 1930. Serial No. 420,346.

This invention relates to ball-and-socket connections such as are commonly used in the heads of tappet adjusting screws or in rod ends or in similar structures wherein the ball is confined permanently in a socket formed in the work.

The primary objects of the invention are to provide a mode of manufacture and a product that is new, simple and relatively inexpensive, and produces ball joints having superior wear-resisting and shock-sustaining qualities.

That manufacturing costs are low is evident from the following facts: Each ball is utilized as a tool to form the socket in which it permanently remains; moreover, the portion of metal which is displaced by the ball during its embedment in the work is automatically moulded into any desired external shape, for example, that of a polygonal bolt head; furthermore, the metal of the work-piece itself is utilized to hold the ball in its socket, instead of employing retainer rings that have to be fabricated individually.

At one stage in the sequence of operations the work grips the ball so securely that it can not be rotated. While so gripped the ball can be readily ground, drilled, welded or otherwise fabricated, the work-piece itself serving as a convenient handle. The expense of separately mounting the ball for machining its face is thereby avoided.

At another stage of the operation the grip of the work on the ball is loosened to permit it thereafter to rotate and function as a ball-and-socket joint. Loosening the ball is accomplished by another novel step of the claimed method. In general, the wear-resisting qualities of the ball joint are improved by compelling the ball to create in the work an accurately spherical socket whose wearing surface is glass-like smoothness and highly polished.

Moreover, a joint made according to this method has remarkable ability to withstand shocks without settling. Settling of the ball in its socket is prevented because the ball itself densifies that portion of the metal of the socket which is immediately back of and supports the ball-engaging surface.

For purpose of illustration, but not by way of limiting either the uses to which the invention may be put in practice, or the scope of the claims, my new method will be described as being applied to the manufacture of a tappet adjusting screw formed with a polygonal head having a rotatable ball embedded therein. Such a screw will serve the purposes of description because it possesses all of the advantages that have been adverted to in the foregoing statement of the objects of the invention.

It is known that good performance of an internal combustion engine requires the assembled over-all length of the tappet and the valve actuated by it to remain unchanged regardless of thousands of impingements of a rapidly rotating engine cam against the tappet. Adjusting screws, the heads of which are fitted with ball joints, have heretofore been used in the valve-contacting ends of such tappets, but in practice a slight settling of the ball in its seat ultimately caused a change in the stated over-all length of the tappet and valve. No way appeared to overcome that defect, because of the practical impossibility of machining sockets accurately enough to fit the ball perfectly.

My method consists of a series of manipulations carried out in sequence, either by automatic or semi-automatic machinery, or manually.

In the drawings Fig. 1 is a view of a piece of bar stock suitable for making a tappet-adjusting bolt.

Fig. 2 is a part sectional view of the work, the head-upsetting plunger shown raised after having performed a preliminary upsetting step.

Fig. 3 is an end view of the work and lower die shown in Fig. 2.

Fig. 4 is a part sectional view of the work showing a ball-embedding plunger in raised position, after having performed the second step of the method.

Fig. 4a is a similar view showing the parts prior to the second step.

Fig. 5 is a side view of the work showing a tool finishing the under side of the bolt head.

Fig. 6 is a part sectional view showing the ball after being ground to a flat face.

Fig. 7 is a detail view indicating by arrows the manner of applying force to loosen the ball in its socket.

Fig. 8 is a part sectional detail view showing the ball being embedded in a piece of work consisting of a large mass of metal.

Fig. 9 is an enlarged sectional view showing the flow of the metal caused by embedding the ball and expanding the head of the work, in tappet manufacture.

Fig. 10 is a detail view showing a rod or handle welded to the ball.

In carrying out my method of manufacture the ball used is preferably the commercial article commonly employed in bearings. The work is any appropriate piece of material having the requisite amount of ductility, for example, commercial steel bars known in the trade as "S. A. E. 1010 to 1045 carbon" are suitable. The shape of the work piece depends upon the use to which the finished article is to be put. A tappet adjusting screw, for instance, usually has a hexagonal head in which the ball is seated as indicated in Fig. 7. For another instance, a large body of metal may have one or many balls seated therein, as shown in Fig. 8. Still another instance is a tappet with a ball seated in the enlarged or upset end of its stem, as shown in Fig. 9.

In order to make a hexagon head tappet-adjusting screw according to the method herein claimed, a piece of work, 1, which may be a bar of iron, soft steel, bronze or other appropriate metal of any suitable length and cross sectional shape is used. Its end 2, Fig. 2, is upset to approximately its final shape and bulk by any suitable means, as by a plunger 4 and a die 5. Preferably, but not necessarily, a cup-like depression 3 is made in the top face of the work during the upsetting operation, for conveniently positioning the balls.

The work-piece 1 with its upset end 2 and depression 3 is then enclosed by an unyielding wall, as by the wall of a head-forming cup die 6, Fig. 4a. The cup 6a in the die 6 is somewhat bigger than the upset end 2 of the work-piece 1, and the shape of the cup is identical with the desired configuration of the completed bolt head. Obviously, at the beginning a clearance space 6b exists between upset end 2 of work-piece 1 and the walls of aperture 6a. The volume of space 6b is substantially equal to the volume of material that will be displaced by the ball during the next step of the operation.

Ball 7, having been placed on the upset end 2 in depression 3, if such a depression has been provided, is forced bodily into the work to a depth slightly greater than the half-diameter of the ball. This may be done by aid of a cupped plunger 8.

During its embedment the ball 7 displaces a certain quantity of the metal of the work, causing it to spread sidewise and also to flow downwardly in advance of the ball, as shown by the shaded flow lines in Fig. 9, which was sketched from an actual tappet end in which a ball was embedded in the manner above stated. The ball creates for itself an exactly fitting hemispherical socket, the ball-contacting walls of which are glass-smooth and polished. Moreover, the metal of the socket immediately back of and supporting the ball-engaging surface is densified and hardened. The greatest depth of increased density is found to be beneath the ball, the relative density and direction of flow of the metal being indicated by elongated shade lines. In gas engine practice, ball sockets that have been produced by the method just described are found to be no wise affected after having been subjected to many thousands of cam impacts that were transmitted from the tappet to the valve, through the ball.

During the forcing-in operation, and when the ball nears its proper depth of embedment the top face and rim of the upset end 2, Fig. 4a, are given typical bolt-head form f, Figs. 4–7, by the working face of embedding plunger 8, Fig. 4, which is appropriately shaped for that purpose, as shown at 9.

The limit of the above described outward and downward flow of metal displaced by the ball is predetermined and the volume of clearance space 6b is made equal thereto. In the embodiment of the invention as illustrated in Figs. 4 to 7 the displacement produced by the ball equals the amount of metal required to form a predetermined hexagonal screw head. In the form shown in Fig. 9, which is an unfinished tappet stem with a ball embedded therein, the displacement volume is that of the upset portion 1a of the work-piece 1. In this case the upset end is later machined to the desired diameter.

Another feature of the invention is that when the ball nears its full depth of embedment the upper marginal lip of socket 11 is pressed inward toward the ball and above the center or greatest diameter of the ball. Thus is formed an annular lip 10 that confines the ball, preventing its subsequent removal from the socket. The ball, while rigidly gripped by the socket walls and by lip 10, may have its exposed face 12 shaped to any desired configuration, such as flat, conical, or otherwise, by grinding, cutting, or by welding on a piece of metal, as shown in Fig. 10. While the ball is thus being shaped the work-piece 1 may be used as a handle for holding the ball.

The ball can be freed from the vise-like grip of socket 11 by applying appropriate pressure to the ball-face 12, or to the sides of the screw head, in the manner indicated by arrows in Fig. 7, thereby increasing the size of the cavity.

Another and very satisfactory method of loosening the ball is especially advantageous when the article is required to be hardened by heat treatment. According to this preferred method the work-piece and ball gripped together as just described are heated to about fifteen hundred fifty degrees Fahrenheit and quenched in water. Upon quenching, the diameter of the ball decreases by shrinking and the walls of the work that surround the ball shrink in thickness, thereby increasing the size of the cavity. Obviously, both shrinkages are in measurements extremely minute and the clearance created between the surface of the ball and the surface of the seat is very small, yet the ball loosens enough to permit it to turn easily in its socket. In the practical operation of this ball-loosening step of my method it has been demonstrated that no oxidation of the ball surface or of the socket surface takes place during the heat treatment and that after quenching the surfaces are as brightly polished as they were when the ball was first embedded.

If the nature of the work does not require the forming of an enlarged head on the work piece, the upsetting step of Figs. 2 and 3 and the head-forming step of Figs. 4 and 4a may be omitted.

According to my method as claimed a ball may be embedded in the flat face of a plate, as shown in Fig. 8. In such case the socket 11 and lip 10 are formed as in making the hexagonal screw head above described, but the unyielding walls of aperture 6a in cup die 6 are not employed because the relatively large surrounding mass of the work piece constrains the metal displaced by the ball and to that extent performs the holding function of die walls 6a without performing its external head-shaping function.

Having thus described my invention, what I claim and desire by Letters Patent is:

1. The method of making a ball joint in a piece of work comprising pressing the ball into the work and thereby embedding it to a depth somewhat greater than the half-diameter of the ball, limiting and constraining the resultant lateral flow of that portion of the metal of the work which is displaced by the ball to form a head of predetermined shape and size, swaging inwardly the surface of the work surrounding the ball to produce an annular ball retaining lip, expanding the metal of the work immediately in contact with the embedded ball and thereby increasing the size of the cavity containing the ball, for the purposes set forth.

2. The method set forth in claim 1, wherein the step of expanding the metal of the work is accomplished by heating the work and the ball, and quenching the same.

3. Making a ball joint in a piece of work by applying a ball to a face of the work and forcibly embedding the ball therein to a depth slightly greater than the half-diameter of the ball while confining the metal laterally displaced by the ball.

4. Making a ball joint in a piece of work by forming a depression in the face of the work, seating a ball in said depression, forcibly embedding the ball in the work to a depth slightly greater than the half-diameter of the ball while confining the metal displaced laterally by the ball.

5. The method of seating a ball a piece of work comprising forcing the ball into the work and thereby embedding it to a depth slightly greater than the half-diameter of the ball while constraining the neighboring peripheral walls of the work within a die the capacity of which is substantially equal to the volume of the work before the ball is embedded plus the volume of the material displaced by the ball during its embedment, thereby imparting a predetermined external shape and size to the work.

6. The method of making a ball joint in a piece of work comprising pressing the ball into the work and thereby embedding it to a depth somewhat greater than the half-diameter of the ball, limiting and constraining the resultant lateral flow of that portion of the material of the work which is displaced by the ball, to form a head of predetermined shape and size, and flanging inwardly a part of the annular surface of the work surrounding the ball, producing an annular ball-retaining lip, expanding the metal of the work immediately in bearing contact with the embedded ball and thereby increasing the size of the cavity containing the ball, for the purposes set forth.

7. The method of making a ball-and-socket joint comprising pressing a ball into a work-piece to a depth slightly greater than the half-diameter of the ball, swaging the metal at the surface of the work-piece around the ball into the form of an annular ball-retaining flange, heating the ball and work-piece and quenching the same.

8. A ball-and-socket joint comprising in combination a ball, a work-piece formed with a ball-retaining socket having its hemispherical ball-engaging face backed by a layer of material of the work that is characterized by having been densified under compressive action of said ball, the metal at the face of said work-piece swaged to present an inwardly projecting annular retaining flange around the periphery of the ball, for the purposes set forth.

In testimony whereof, I affix my signature.

JOSEPH H. HOERN.